United States Patent [19]
Mairesse et al.

[11] Patent Number: 5,374,145
[45] Date of Patent: Dec. 20, 1994

[54] DEVICES FOR ANCHORING ONE PART RELATIVE TO ANOTHER

[75] Inventors: Yves Mairesse, Dimont, France; Yves Debleser, Naast, Belgium

[73] Assignee: Jeumont-Schneider Industrie, Puteaux, France

[21] Appl. No.: 960,539

[22] Filed: Oct. 13, 1992

[30] Foreign Application Priority Data

Oct. 16, 1991 [FR] France ................ 91 12776

[51] Int. Cl.[5] .............. F16B 13/06; B23P 11/02; B25G 3/20
[52] U.S. Cl. ...................... 411/54; 411/60; 411/107; 411/354; 403/370; 29/525.1
[58] Field of Search .......... 411/54, 55, 60, 107, 411/108, 109, 354; 403/16, 368, 370, 371; 29/525.1

[56] References Cited

U.S. PATENT DOCUMENTS

| 2,403,810 | 7/1946 | Lord | 411/108 |
|---|---|---|---|
| 3,175,455 | 3/1965 | Reddy | 403/370 X |
| 3,477,335 | 11/1969 | Gold et al. | 411/54 |
| 3,503,638 | 3/1970 | Holzel | 403/370 |
| 3,603,626 | 9/1971 | Whiteside | 411/60 X |
| 3,855,896 | 12/1974 | Kaufman | 411/60 X |
| 5,090,853 | 2/1992 | Madsen | 411/354 |

FOREIGN PATENT DOCUMENTS 1449452  9/1976  United Kingdom ............. 411/54

Primary Examiner—Neill R. Wilson
Attorney, Agent, or Firm—Rines and Rines; Shapiro and Shapiro

[57] ABSTRACT

The invention relates to devices for anchoring one part (P) relative to another (M) comprising a nut (4) and a conical ring (5), the base (1) of the part to be anchored (P) made up of first part (2) around which said nut (4) passes and a second truncated cone shaped part (3) receiving the conical ring (5), a hole (6) in the anchoring part (M) receiving the base (1) and its conical ring (5), the bottom of said hole (6) being provided with spring washers (9).

21 Claims, 3 Drawing Sheets

DEVICES FOR ANCHORING ONE PART RELATIVE TO ANOTHER

This invention relates to devices for anchoring one part relative to another.

More particularly, these anchoring devices comprise clamping cone type devices.

Mechanical connections using clamping cone couples are already known. In the machine tool field in particular, it might for example be mentioned the cones of milling cutters, expansion bolts, couplings with conical clamping sleeves or even torque limiters using this principle.

This invention proposes a new type of anchoring device which allows in particular the non-emergent implanting of a first part into the "skin" of a second solid part.

The object of the present invention is therefore devices for anchoring one part relative to another, the part to be anchored designed to be rigidly locked to the anchoring part by a base that terminates it at one of its ends, a hole having been provided in said anchoring part to receive said base of the part to be anchored, said devices being characterised in that they comprise a nut bearing an external thread and a conical ring, the base of the part to be anchored comprising a first part around which said nut is designed to pass and a second part in the shape of a truncated cone which flares out from said first part towards the exterior, the internal walls of the conical ring being designed to mate with the external walls of said truncated cone part, the dimensions and shape of the walls of the hole provided in the anchoring part to receive said conical ring being such that they allow, on the one hand, the introduction of the base and its conical ring into said hole, and on the other, the holding of the said base and the part to be anchored by clamping the external walls of said conical ring over at least a portion of the internal walls of said hole, said hole also being designed to receive the above-mentioned nut and being provided with a thread that complements the thread of the nut and with which it is designed to work to keep the said nut in the said hole, said anchoring devices also comprising spring forming means designed to push back, relative to each other, the truncated cone-shaped part of the base and the conical ring, when said ring is in place in said hole, in order to achieve the above-mentioned clamping.

Such anchoring devices present many advantages. The anchoring obtained is strong and extremely simple to accomplish, so that the implants that said devices make possible are very reliable. These devices greatly facilitate assembly and disassembly, and allow different parts made from fondamentally different materials to be joined such as an aluminum implant into a steel part or a lead implant into an iron part, etc.

Furthermore, these anchoring devices make it possible to very accurately adjust the orientation of implanted parts. The anchoring obtained exhibits very good compression resistance and allows combined external tractional and torsional forces of the first part to be relieved by the second part and elimination of prestressing and concentration of stresses.

These devices are advantageously completed by the following different characteristics taken either separately or according to all their possible technical combinations.

The hole provided in the anchoring part which is designed to receive the base of the part to be anchored is a recessed hole.

The spring forming means comprise two spring washers arranged in opposition at the bottom of the receiving recessed hole, the end of said base designed to bear upon said washers when it is in position in the receiving hole.

The external walls of the conical ring and the portion of the internal walls designed to work with the external walls of said conical ring are cylindrical.

The walls of the hole define, for the said hole, several superposed bores of different diameters, the bore emerging from the anchoring part being designed to receive the nut, being larger in diameter than the bore extending therefrom and which is designed to receive the conical ring, these two bores being separated from each other by an annular step, the conical ring being provided with a surrounding annular protuberance towards its end close to the nut and which bears against the said annular step.

The nut comprises at its portion closest to the conical ring, an annular skirt which, once the said devices are in position, surrounds the annular protuberance of the conical ring, said conical ring thus being held when the base is in position in the recessed hole, particularly by the wedging of the above-mentioned annular protuberance between said nut and above-mentioned step.

The portion of the walls of the hole receiving the conical ring and the external walls of said conical ring are dimensioned H7/g6.

The conical ring is constructed from two half-rings designed to close one on top of the other, said half-rings being provided with an elastic keeper which surrounds them in order to hold them in position relative to each other.

Another object of this invention is the use of the above-mentioned devices to anchor one part relative to another part where the part to anchor and the anchoring part are made from fundamentally different materials, such as, respectively, aluminum and steel, or lead and iron.

Another object of the invention is also the use of the above-mentioned devices to anchor one part relative to another in the case where the part to anchor must be precisely adjusted in orientation.

The following description of a particular embodiment of the invention is purely illustrative and non-limiting. It must be read in conjunction with the accompanying drawings. In these drawings.

Figure 1:
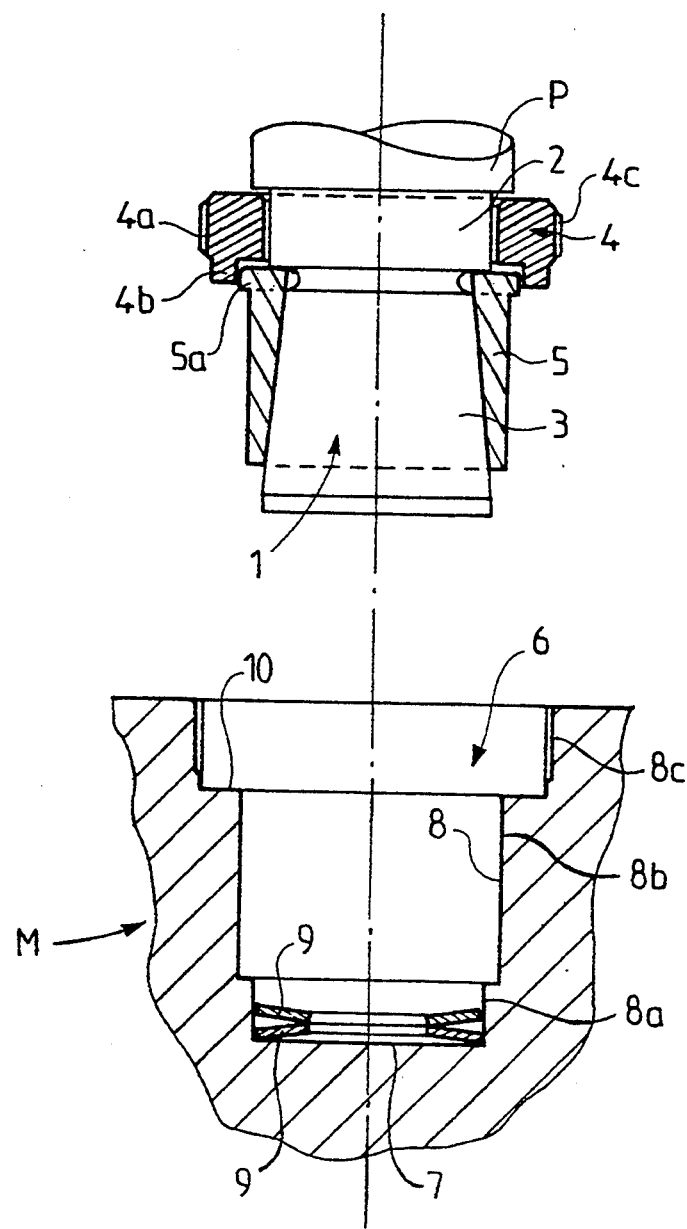
FIG. 1 is a cross-sectional view of the base of a part to be implanted and of a recessed hole made in the skin of a solid part which is to serve as the implant support, in respective positions where the said base and the said recessed hole are separated, said base and said recessed hole being fitted with anchoring devices according to a particular embodiment of the invention.

Reference will now be made to FIG. 1. FIG. 1 shows base 1 of a part P that is to be implanted in the "skin" of a solid support M. This base has been machined beforehand and comprises two main parts, one, referenced by 2, and the other by 3. Part 2 is directly in the extension of part P and cylindrical in shape. Part 3 axially extends said part 2 on the side of said part 2 opposite said part P. The shape of this part is mainly of a truncated cone, flaring out from said part 2 towards the exterior. The large diameter of the said part 3 substantially corresponds to the diameter of cylindrical part 2. An annular groove 3a is provided in the upper part of part 3 where it intersects with part 2.

Base 1 is associated with a nut 4 and also a conical clamping ring 5. Nut 4 is fitted on said base 1 at its cylindrical part 2, which the nut surrounds. Said nut 4 is a nut with an external thread. It comprises a main part 4a which is a ring of substantially rectangular annular section and on whose external face is machined a thread 4c of said nut 4. The internal diameter of ring 4a corresponds substantially to the external diameter of part 2 of base 1. The height of said ring 4a is slightly less than the height of said part 2. This ring 4a is completed by a skirt 4b which is also cylindrical and arranged coaxially to ring 4a. This skirt 4b extends from the skirt of the faces of ring 4a which is designed to directly face the recessed hole in which base 1 will be implanted. Its internal diameter corresponds substantially to a position midway of the thickness of the ring 4a in a radial direction. Its external diameter is slightly less than the external diameter of said ring 4a.

Clamping ring 5 is a ring in two parts which closes over the truncated cone part 3 of base 1. The internal shape of clamping ring 5 is designed to substantially mate with the external shape of part 3 up to a diameter of said part 3 close to the diameter of the end of said part 3. The shape of the external wall of this clamping ring 5 is mainly cylindrical and is terminated at its end directly facing nut 4 by a radial annular protuberance 5a arranged coaxially to it. The external diameter of this protuberance 5a is slightly less than the internal diameter of skirt 4b. Their heights are substantially identical.

With continued reference to FIG. 1, a recessed hole 6 is shown made in the "skin" of a solid support M and in which it is intended to implant base 3. This recessed hole 6 is delimited by a bottom 7 and walls 8 extending from said bottom 7 up to the surface of solid part M. These walls 8 define three coaxially arranged cylindrical bores 8a, 8b and 8c of different diameters. These cylindrical bores 8a, 8b and 8c are superposed and separated from each other by annular steps. Bore 8a extends directly from bottom 7 and its diameter substantially corresponds to the largest diameter of truncated cone part 3 of base 1, relative to which bore 8a is slightly larger in diameter. The internal diameter of intermediate bore 8b corresponds substantially to the external diameter of the main part of ring 5. Its height corresponds substantially to the height of the main part of ring 5, said part extending from the end of said ring 5 that directly faces said bottom 7 up to the end of the walls of protuberance 5a. Bore 8c opens into the surface of the solid support M, the diameter of said bore 8c substantially corresponding to the external diameter of nut 4. The walls of said bore 8c are provided with an internal thread which cooperates with the external thread 4c of nut 4. The separating step between bores 8b and 8c is referenced by 10.

In bore 8a, two spring washers 9 mounted in opposition are arranged on bottom 7 of recessed hole 6. These washers 9 are centred by their external diameters which correspond to the internal diameters of said cylindrical portion 8a.

Figure 2:
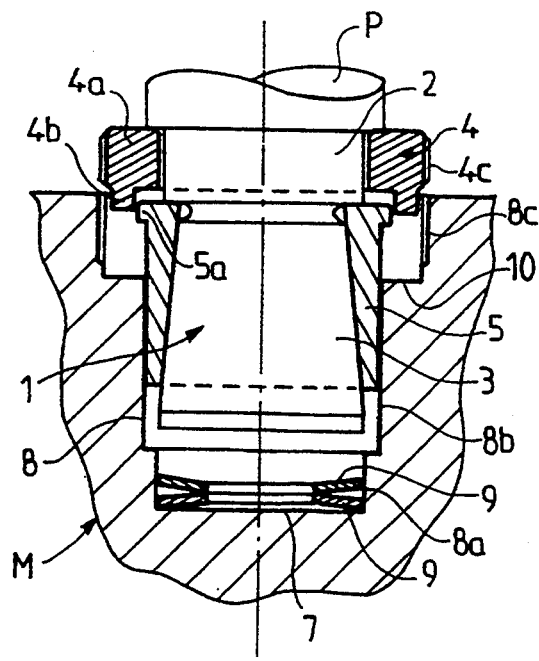
FIG. 2 is a cross-sectional view of the same elements in a first position where the said base is engaged relative to the recessed hole.

A description now follows of the positioning of base 1 in recessed hole 6. FIG. 2 shows base 1, its nut 4 and ring 5 in a presentation position relative to recessed hole 6. Part 3 and ring 5 can be introduced without difficulty into bore 8b thanks to an H7/g6 adjustment between the walls of said bore 8 and the external walls of clamping ring 5.

Figure 3:
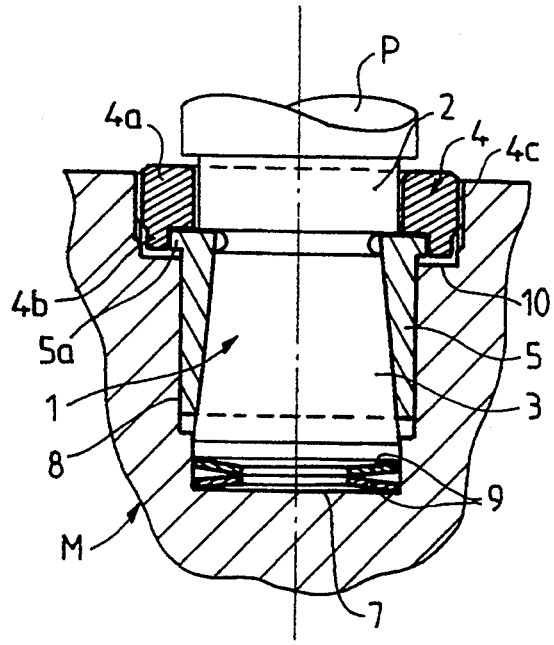
FIG. 3 is a cross-sectional view of the same elements in a second engaged position of the base relative to the recessed hole.

Once this introduction has been completed, an operator, for example manually, proceeds to screw thread 4c of nut 4 onto the walls of bore 8c until, for example, the position shown in FIG. 3 has been reached. As nut 4 descends into said bore 8c, its face facing bottom 7 comes to bear against the end on ring 5 carrying protuberance 5a which is surrounded by annular skirt 4b. The internal walls of said ring 5 exert force on the external walls of part 3 in such a way that the introduction of the base 1 continues. The end of said part 3 with the largest diameter now comes into contact with washers 9.

Figure 4:
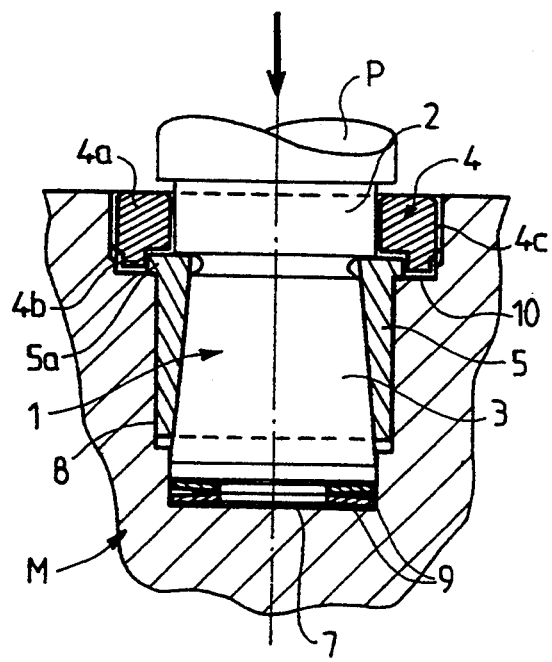
FIG. 4 is a cross-sectional view showing the positioning of the anchoring devices at a further stage of the construction process of the invention.

The final anchoring stage of part P in solid support M is shown in FIG. 4. At the time of this stage, a compression tool, such as a clamp type tool, is used to act, as indicated by the arrow shown in the Figure, to crush washers 9 by applying a force to part P and base 1 according to the characteristics of above-mentioned washers 9. The crushing of washers 9 is limited, on the one hand, by the abutment of annular shoulder 5a on step 10 between bore 8c and bore 8b, and on the other hand, by the abutment of the cylindrical end face of part 2 of base 1 facing bottom 7 on the thicker end of ring 5. Simultaneously with the action of the compression tool, nut 4 is also brought to a final position where skirt 4b abuts on above-mentioned step 10.

Figure 5:
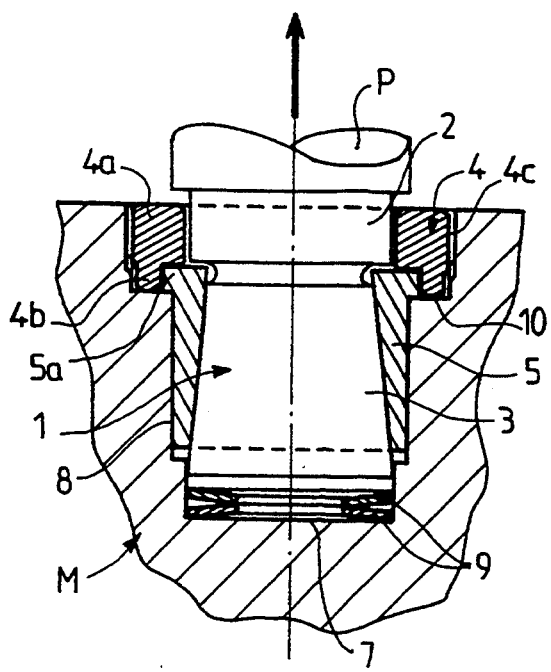
FIG. 5 is a cross-sectional view of the same elements in an anchoring position of the base in the recessed hole.

The final position of the different component parts of the said anchoring devices after positioning is shown in FIG. 5. When the compression tool used in the preceeding stage release part P and base 1, said base 1 is pushed back, as shown by the arrow on the Figure, by the action of spring washers 9 on truncated cone part 3. Since conical ring 5 is held in position in recessed hole 6, the rising of truncated cone part 3 in recessed hole 6 results in ring 5 and said part 3 wedging themselves against the walls of bore 8b. Nut 4 also receives some of the force exerted by washers 9.

Any further traction on part P will increase the clamping of ring 5 in bore 8b without supplementary loading on nut 4 which, after starting, only plays a retaining function. Note that the resisting section of these anchoring devices works without any assembly prestressing. These anchoring devices are able to relieve any external tractional and/or torsional forces to which part P may be subjected.

For disassembly, an initial unwedging action is required. This could be, for example, performed by either using a similar tool to that used for final positioning and applying a larger force than that applied to achieve assembly, or by striking on the axis of part P using a hammer type tool in order to induce in the said part sufficient vibrations to cause the different elements forming the anchoring devices to become unwedged from each other. Once unwedged, sufficient compression must be kept on part P and its base 1 in order to unlock nut 4. Part P and its base 1 can be released by the tools progressively to accompany the unscrewing of the nut. Nut 4 and ring 5 are disengaged by reversal of the assembly procedure.

Note that the orientation of part P can be adjusted over 360°. Such an adjustment is possible either at the time said part P is mounted during the final positioning stage just before the point when shoulder 5a comes into contact with step 10, or during disassembly, using compression to obtain the same configuration as that used in the "mounting" stage, and without it being necessary to unlock nut 4. In both cases, spring washers 9 are compressed in such a way that force is no longer exerted on step 10 or shoulder 5a. Spring washers 9 will accompany this rotational movement by friction at the edges of their inside diameter.

Figure 6:
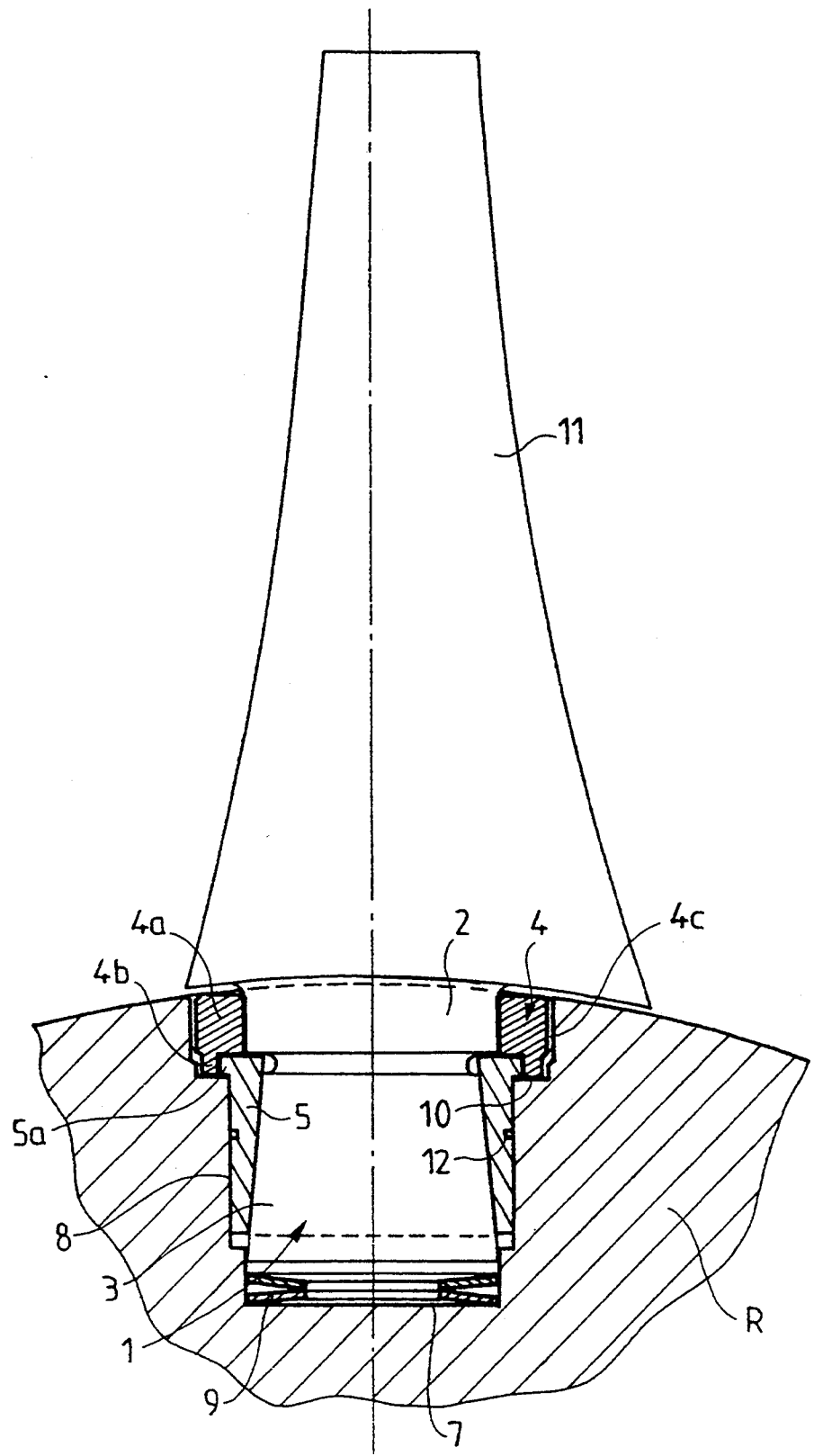
FIG. 6 is a cross-sectional view showing, for a turboalternator fan, the rigid locking of a blade onto the rotor of the said fan using anchoring means according to the invention.

Such an anchoring device may be used in a large number of industrial applications. FIG. 6 shows how such a device can be used to anchor an aluminum fan blade 11 onto a rotor R of a 65 MVA turboalternator designed for 3600 rpm and an overspeed of 4320 rpm. The two parts of ring 5 are held together by an elastic spring wire keeper 12 which surrounds them and which causes them to return to the g6 configuration as soon as the force exerted on them by truncated cone part 3 of ring 2 is removed, thereby facilitating assembly and disassembly operations. The conicity chosen for part 5 of base 1 and for ring 3 is 20%. This conicity generally depends on the material from which the element to be anchored is made, the planned axial displacements of this element, the forces to be relieved by the clamping, etc. Likewise, the diameter and height of the two half-rings depend on the desired dimensioning of the anchoring. Washers 9 are chosen according to the desired minimum and maximum forces to be used for preclamping.

Anchoring devices according to the present invention are advantageously used to fix elements made from material sensitive to gripping such as stainless steel, aluminum, nylons, etc., which require a non-emergent and shallow implanting in a solid part. They can also be used advantageously for parts subject to strong combined forces of shearing and torsion.

The reference signs inserted after the technical characteristics mentioned in the claims serve only to facilitate comprehension of said claims, and in no way limit their scope.

We claim:

1. A device for anchoring a part (P) relative to an anchoring part (M), the part to be anchored (P) being designed to be rigidly locked to the anchoring part (M) by a base (1) that terminates the part to be anchored (P), a hole (6) having been provided in said anchoring part (M) to receive said base (1) of the part to be anchored (P), said device being characterized in that it comprises: an externally threaded nut (4) and a conical ring (5); the base (1) of the part to be anchored (P) includes a first part (2) around which said nut (4) is disposed and a second part in the shape of a truncated cone (3) which extends and flares out from said first part (2) and around which said conical ring (5) is disposed; internal walls of the conical ring (5) are configured to mate with external walls of said truncated cone-shaped second part (3); said hole (6) has internal walls dimensioned and shaped such that they allow, on the one hand, introduction of the base (1) and the conical ring (5) into said hole (6) and, on the other hand, the holding of the said base (1) and the part to be anchored (P) by clamping the external walls of said conical ring (5) over at least a portion (8b) of the internal walls of said hole (6); said hole (6) is configured to receive said nut (4) and is provided with an internal thread (4c) that cooperates with the external thread of said nut (4) for retaining said nut (4) in said hole (6); and spring forming means (9) is provided for urging the truncated cone-shaped second part (3) of the base (1) in a direction back out of said hole (6), when said conical ring (5) is in place in said hole (6), in order to achieve the above-mentioned clamping.

2. A device as claimed in claim 1 wherein the hole (6) provided in the anchoring part (M) which is designed to receive the base of the part to be anchored (P) is a recessed hole.

3. A device as claimed in claim 11, wherein the spring forming means comprises two spring washers (9) arranged in opposition at the bottom (7) of said hole (6), and an end of said base (1) is designed to bear upon said washers (9) when said base is in position in said hole (6).

4. A device as claimed in claim 3, wherein said external walls of the conical ring (5) and said portion (8b) of the internal walls of said hole (6) are cylindrical.

5. A device as claimed in claim 4, wherein the internal walls of said hole (6) define a plurality of superposed bores (8b, 8c) of different diameters, including a first bore (8c) at an entrance to said hole (6) designed to receive the nut (4), and a smaller diameter second bore (8b) extending from said first bore and which receives the conical ring (5), these two bores (8b, 8c) being separated from each other by an annular step (10), the conical ring (5) being provided with an annular protuberance (5a) therearound at its end close to the nut (4) for bearing against said annular step (10).

6. A device as claimed in claim 5, wherein the nut (4) comprises annular skirt means (4b) for surrounding the annular protuberance (5a) of the conical ring (5), such that when the base (1) is in position in the recessed hole (6), said conical ring (5) is held by wedging of said annular protuberance (5a) between a portion of said nut (4) from which said skirt means extends and said step (10).

7. A device as claimed in claim 6, wherein said conical ring (9) is constructed from two half-rings provided with an elastic keeper (12) which surrounds them in order to hold them in position relative to each other.

8. A device as claimed in any one of the preceding claims, wherein the part to be anchored (P) and the anchoring part (M) are made from different materials.

9. A device as claimed in any one of the preceding claims nos. 2–6 and 7, wherein the part to be anchored (P) requires a precisely adjusted orientation when anchored.

10. A device for anchoring one part (P) to another part (M) provided with a hole having an internally threaded portion, said device comprising a base (1) extending from said one part (P) to be received in said hole, a nut (4) disposed about a first part (2) of said base and having an external thread (4c) for threadably engaging the internally threaded portion of said hole, a ring (5) disposed about a truncated cone-shaped part (3) of said base and which extends and flares outwardly from said first part (2), said ring (5) having inner walls complementary to outer walls of said truncated cone-shaped part (3) of said base and having outer walls for engagement with a portion of the hole inner walls, and spring means adapted for insertion into the hole for urging said truncated cone-shaped second part of said base in a direction back out of the hole, whereby said ring (5) is wedged against said portion of the hole inner walls by engagement of the complementary ring inner walls and outer walls of said truncated cone-shaped second part (3).

11. A device as claimed in claim 10, wherein said spring means comprises a pair of spring washers (9) adapted to bear upon an end of said base (1).

12. A device as claimed in claim 10, wherein said ring (5) has an annular protuberance (5a) therearound at its end close to said nut (4), and said nut (4) has projecting annular skirt means (4b) for surrounding said annular protuberance in an anchored state of the device.

13. A device as claimed in claim 10, wherein said ring (5) includes a plurality of partial rings surrounded by an elastic keeper (12) which holds said partial rings in position relative to one another.

14. A method of anchoring one part (P) to another part (M), comprising the steps of:
providing said another part (M) with a hole having an internally threaded portion;
providing said one part (P) with an anchoring device including a base (1) extending from said part (P) for insertion in said hole, a nut (4) disposed about a first part (2) of said base and having an external thread (4c) for threadably engaging the internally threaded portion of said hole, a ring (5) disposed about a truncated cone-shaped second part (3) of said base and which extends and flares outwardly from said first part (2), said ring (5) having inner walls complementary to outer walls of said truncated cone-shaped second part (3) of said base and outer walls for engagement with a portion of the hole inner walls, and spring means (9) adapted for insertion into said hole for urging said truncated cone-shaped second part (3) of said base in a direction back out of said hole; and
inserting the aforesaid components of said anchoring device into said hole such that said nut (4) threadably engages said hole and said spring means urges said truncated cone-shaped second part (3) of said base in a direction back out of said hole to wedge said ring (5) against the hole inner walls by engagement of the complementary ring inner walls and outer walls of said truncated cone-shaped second part (3).

15. The method of claim 14, wherein said spring means comprises two spring washers (9), and said spring washers are inserted in a bottom of said hole and bear upon an end of said base.

16. The method of claim 14, wherein said outer walls of said ring (5) and the inner walls of said hole with which they engage are cylindrical.

17. The method of claim 16, wherein the inner walls of said hole define a plurality of superposed bores (8b, 8c) of different diameters, including a first bore (8c) at an entrance to said hole and providing said internally threaded portion, and a smaller diameter second bore (8b) extending from said first bore and which receives said ring (5), and wherein said two bores are separated from each other by an annular step (10) of said hole, said ring (5) having an annular protuberance (5a) therearound at its end close to said nut and which bears against said annular step (10) in the anchored state of said anchoring device.

18. The method of claim 17, wherein said nut includes annular skirt means (4b) for surrounding said annular protuberance (5a), and wherein when said components are inserted into said hole as aforesaid, said ring (5) is held by wedging of said annular protuberance (5a) between a portion of said nut from which said skirt means extends and said step (10).

19. The method of claim 14, wherein said ring (5) includes a plurality of partial rings surrounded by an elastic keeper (12) which holds said partial rings in position relative to each other.

20. The method of claim 14, wherein said one part (P) and said another part (M) are made from different materials.

21. The method of claim 14, wherein said one part (P) is precisely oriented relative to said another part (M) during or after said inserting step.

* * * * *